(12) United States Patent
Lee et al.

(10) Patent No.: US 6,521,708 B2
(45) Date of Patent: Feb. 18, 2003

(54) MELT PROCESSIBLE FLUOROPOLYMER COMPOSITION

(75) Inventors: Jeong Chang Lee, Shimizu (JP); Shosaku Kondo, Shimizu (JP); Hajime Sato, Shimizu (JP)

(73) Assignee: DuPont Mitsui Flurochemicals, Tokyo (JP)

( * ) Notice: Subject to any disclaimer, the term of this patent is extended or adjusted under 35 U.S.C. 154(b) by 0 days.

(21) Appl. No.: 09/992,989

(22) Filed: Nov. 16, 2001

(65) Prior Publication Data

US 2002/0111433 A1 Aug. 15, 2002

(30) Foreign Application Priority Data

Dec. 6, 2000 (JP) ........................................ 2000-371307

(51) Int. Cl.[7] .............................................. C08L 27/12
(52) U.S. Cl. ..................................................... 525/199
(58) Field of Search ......................................... 525/199

(56) References Cited

U.S. PATENT DOCUMENTS

| | | | |
|---|---|---|---|
| 2,946,763 A | 7/1960 | Bro et al. | |
| 3,132,124 A | 5/1964 | Couture et al. | |
| 4,380,618 A | 4/1983 | Khan et al. | |
| 5,041,500 A | 8/1991 | Ishiwari et al. | |
| 5,700,889 A | 12/1997 | Blair | |
| 5,760,151 A | 6/1998 | Aten et al. | |
| 6,426,386 B2 * | 7/2002 | Lee et al. .................... | 525/199 |

FOREIGN PATENT DOCUMENTS

EP 1000976 A1 5/2000

OTHER PUBLICATIONS

Ullmann's Encloclopedia of Industrial Chemistry, "Fluoropolymers, Organic", vol. A 11, D. Peter Carlson et al., VCH Verlagsgesellschaft mbH, D–6940 Weinheim, 1988, p. 393–403.

"Phase Behavior of Crystalline Blends of Poly(tetrafluoroethylene) and of Random Fluorinated Copolymers of Tetrafluoroethylene", Rachele Pucciariello, Carmela Angioletti, Journal of Polymer Science: Part B: Polymer Physics, vol. 37, 679–689 (1999).

"Crystallization Behavior of High–Density Polyethylene/Linear Low–Density Polyethylene Blend", A. K. Gupta, S. K. Rana, and B. L. Deopura, Journal of Applied Polymer Science, vol. 44, 719–726 (1992).

* cited by examiner

*Primary Examiner*—Nathan M. Nutter

(57) ABSTRACT

Blends of 3 to 97 parts by weight of tetrafluoroethylene/hexafluoropropylene copolymer containing 3 to 9 wt % hexafluoropropylene and 0 to 4 wt % of tetrafluoroethylene/perfluoro(ethyl vinyl ether) or tetrafluoroethylene/perfluoro(methyl vinyl ether), with 97 to 3 parts by weight tetrafluoroethylene/perfluoro(ethyl vinyl ether) or tetrafluoroethylene/perfluoro(methyl vinyl ether), which co-crystallize are found to have improved melt strength and improved mechanical properties, and a higher service temperature than the tetrafluoroethylene/hexafluoropropylene copolymer.

4 Claims, 4 Drawing Sheets

MELT PROCESSIBLE FLUOROPOLYMER COMPOSITION

FIELD OF THE INVENTION

The present invention relates to melt processible fluoropolymer compositions made by blending at least two different melt processible tetrafluoroethylene copolymers.

BACKGROUND OF THE INVENTION

Tetrafluoroethylene-hexafluoropropylene copolymers (also known as TFE/HFP) have the physical, chemical, mechanical, thermal and electrical properties characteristic of fluoropolymers and can be easily extruded or injection molded. HFP content of commercial copolymers is within the range 9.6 to 17.6 wt % (Ullmann's Encyclopedia of Industrial Chemistry, 5$^{th}$ ed., vol. A 11, p. 403, §2.3.2, VCH Verlagsgesellschaft mbH, D-6940 Weinheim, Germany, 1988. The HFP index referred to in this article can be converted to wt % HFP by multiplying by 3.2, as disclosed in U.S. Pat. No. 5,700,889.). Such properties have led to a growth in the demand for TFE/HFP copolymers, particularly in wire coating applications (e.g., plenum cable). To further increase productivity, there is a need for tetrafluoroethylene-hexafluoropropylene copolymers that can be extruded at higher speeds without loss of extrudate continuity or reduction in the mechanical properties of the extruded article, for example fluoropolymer-coated wire. Existing TFE/HFP copolymers are unable to fully meet to such requirements. Although the melt flow of TFE/HFP can be increased by lowering its molecular weight, this is accompanied by a decline in the mechanical properties of the shaped article and a reduction in melt strength, i.e. a tendency for the molten polymer to tear or separate frequently while being stretched and coated, for example onto a metal conductor. This tearing limits the speed of the coating operation. Thus, lowering the molecular weight does not constitute a basic solution.

A number of cases are known in which fluoropolymers have been blended to improve the physical properties of the melt processible fluoropolymer. For example, blends of TFE/HFP and tetrafluoroethylene-perfluoro(alkyl vinyl ether) (PFA) are described in U.S. Pat. No. 5,041,500, and in the Journal of Polymer Science: Polymer Physics 37, p. 679 (1999). The patent discloses mixtures of TFE/HFP copolymers with tetrafluoroethylene-perfluoro(propyl vinyl ether) (TFE/PPVE), but states that the two components do not co-crystallize. The above-referenced article describes a miscible blend of a TFE/HFP with tetrafluoroethylene-perfluoro(methyl vinyl ether) (TFE/PMVE). However, the TFE/HFP has a low comonomer content and is therefore very similar to polytetrafluoroethylene (PTFE), making it unattractive as a melt-processible material.

European Patent No. 1 000 976 A1 discloses blends of crystalline fluoropolymer with amorphous fluoropolymer or with fluoropolymer containing amorphous segments and crystalline segments for the purpose of reducing the size of the spherulites in the polymer. These segmented copolymers are also known as block polymers because the distribution of monomers throughout the polymer varies according to the block or segment of the polymer that is being considered. In contrast, typical commercial fluoropolymers are "random" or "statistical" copolymers, the distribution of the monomers along the polymer chain being determined by the monomer reactivity ratios and the concentrations of monomers during the polymerization. Other things being equal, amorphous fluoropolymers are more costly and difficult to make than crystalline fluoropolymers because the former contain less of the lower cost and more reactive fluoromonomer, tetrafluoroethylene. Block copolymers are also more difficult to make because they are conventionally prepared in multistep processes.

New blends of fluoropolymers are needed that will permit faster extrusion rates with no sacrifice of melt strength or mechanical properties, and preferably with improved melt strength and mechanical properties.

SUMMARY OF THE INVENTION

In accordance with the present invention, improvements in TFE/HFP copolymers are obtained by blending therein a PFA based on perfluoro(methyl vinyl ether) (PMVE) or perfluoro(ethyl vinyl ether) (PEVE). In particular it has been discovered that the use of a TFE/HFP dipolymer of a specific composition, or a TFE/HFP terpolymer of a specific composition arrived at by copolymerizing a small amount of PPVE or PEVE or PMVE with the TFE and HFP, yields a blend with the PFA copolymer having good miscibility. The resulting blend has a flex life and melt strength that are greatly improved over those of TFE/HFP alone. The blend also has improved high-speed processibility in wire coating applications.

Thus the present invention is a melt processible fluoropolymer composition that is a miscible blend of at least two different melt processible fluoropolymers, which composition partakes of the excellent properties of each of the starting materials, and also has improved high-speed wire coating processibility and flex life. By miscible is meant that the composition is homogeneous in the melt phase and that the components co-crystallize on cooling to the solid phase.

Accordingly, the invention provides a melt processible fluoropolymer composition having a single crystallization temperature and a single melting point, as measured with a differential scanning calorimeter, said composition comprising:

(A) about 3 to about 97 parts by weight of a tetrafluoroethylene-hexafluoropropylene copolymer comprising about 3 to about 9% by weight (wt %) hexafluoropropylene, and 0 to about 4 wt % of a third monomer that is at least one additional monomer selected from the group consisting of perfluoro(propyl vinyl ether) (PPVE), perfluoro(ethyl vinyl ether) (PEVE), and perfluoro(methyl vinyl ether) (PMVE), and about 89 to about 97 wt % tetrafluoroethylene; and (B) about 97 to about 3 parts by weight of a copolymer comprised of about 80 to about 99 wt % tetrafluoroethylene with about 1 to about 20 wt % of one or more comonomers selected from the group consisting of perfluoro(ethyl vinyl ether) and perfluoro(methyl vinyl ether).

BRIEF DESCRIPTION OF THE DRAWINGS

FIG. 1 presents differential scanning calorimetry charts obtained for an TFE/HFP-3 (C)/PFA-C2 (E) mixture.

FIG. 2 presents differential scanning calorimetry charts obtained for an TFE/HFP-3 (C)/PFA-C2 (F) mixture.

DETAILED DESCRIPTION

Figure 1A:
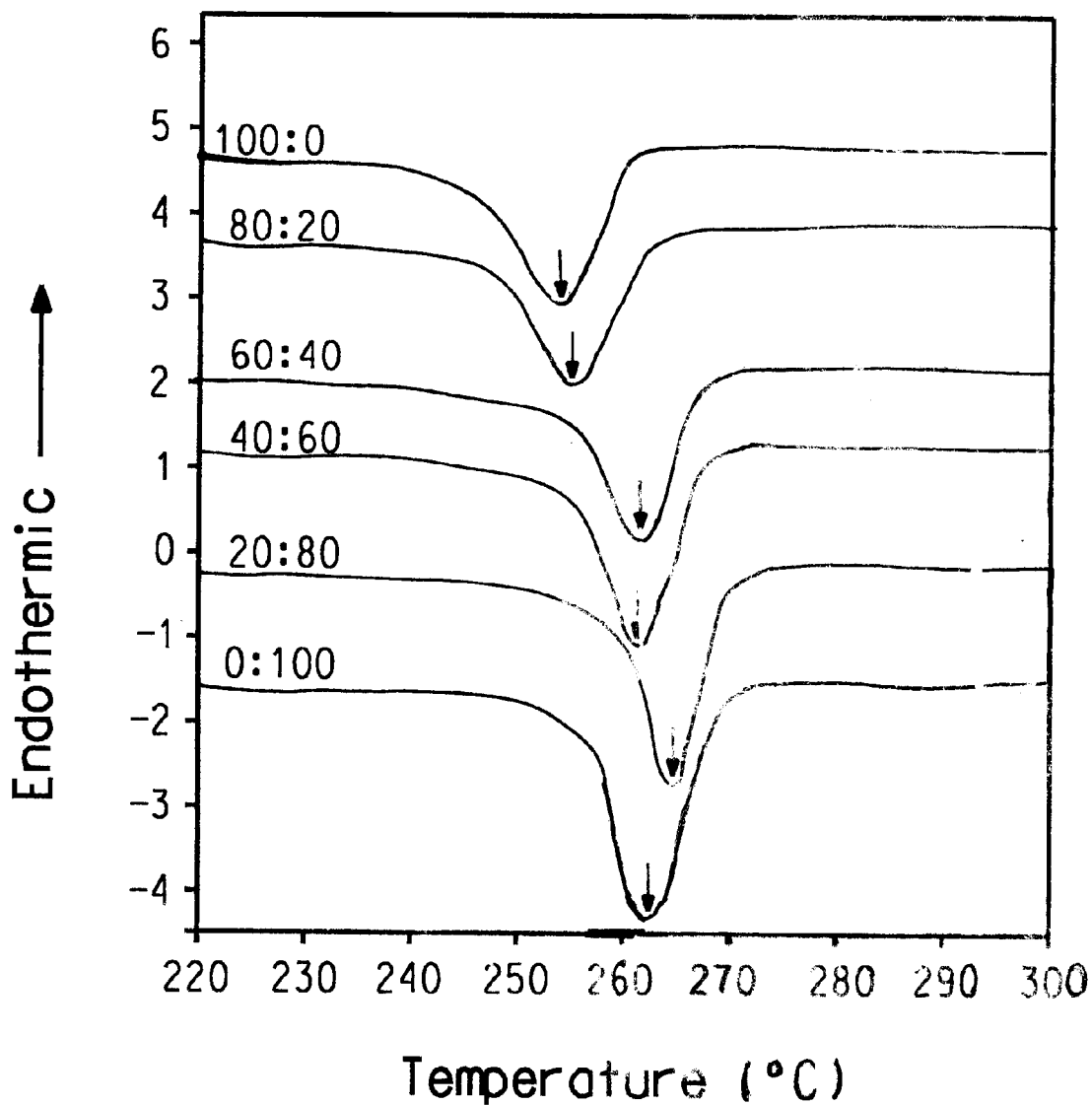
FIG. 1(a) shows the crystallization peak.

The fluoropolymers of this invention can be made according to the methods disclosed in U.S. Pat. No. 5,760,151 for the PFA polymers. For TFE/HFP copolymer, references may be found in U.S. Pat. Nos. 2,946,763; 3,132,124; and 4,380,618. In the polymers of this invention the monomers are distributed statistically as determined by their reactivity ratios and concentrations during polymerization. They are random polymers, not block polymers.

The TFE/HFP serving as component A in the inventive composition has an HFP content of about 3 to about 9 wt %, preferably about 3 to about 8 wt %, and more preferably at least about 3 to less than 7 wt %; about 0 to about 4 wt %, preferably about 0.1 to about 3 wt %, of a third monomer that is at least one additional monomer selected from the group consisting of PPVE, PEVE, and PMVE; and a TFE content of about 89 to about 97 wt %, preferably about 90 to about 96 wt %. An HFP content higher than that indicated above reduces the TFE content below the above range, lowering the crystallinity and crystallization temperature of copolymer A, and thereby increasing the difference between the crystallization temperature of copolymer A and the crystallization temperature of copolymer B. When this difference is too great, the component having the higher crystallization temperature crystallizes first and separately from the lower melting component, resulting in phase separation, and therefore co-crystallization does not occur. In cases where component A contains PPVE, PEVE, or PMVE, it is preferable that the amount in component A be lower than the amount of PEVE or PMVE in copolymer B.

As illustrated subsequently in the examples and comparative examples, a composition obtained by mixing copolymer A having an HFP content of 6.5 wt %, a PEVE content of 1.8 wt % and a TFE content of 91.7 wt % with copolymer B having a PEVE content of 7.1 wt % exhibits a single crystallization temperature and a single melting point, which shows that the components have co-crystallized. However, a composition obtained by mixing a copolymer A having an HFP content of 11.5 wt %, a PEVE content of 1.2 wt % and a TFE content of 87.3 wt % with a copolymer B having a PEVE content of 7.1 wt % exhibits two crystallization temperatures or melting points corresponding to each of the blend components, which shows that the components do not co-crystallize.

PEVE or PMVE are preferred comonomers for copolymer A and copolymer B, with PEVE being more preferred. It is more preferred that, if a third monomer is used in copolymer A, it be the same monomer that is used in copolymer B.

The PFA which is used as component B in the inventive composition has a PEVE or PMVE content of about 1 to about 20 wt %, and preferably about 2 to about 15 wt %; and a TFE content of about 80 to about 99 wt %, and preferably about 85 to about 98 wt %. Given the cost of PFA, it is preferred that the composition contain more of copolymer A with its higher TFE content. Because too large a difference in the TFE contents of the two components prevents co-crystallization, the difference in TFE content between copolymer A and copolymer B should not be greater than about 6 wt %, and preferably within a range of about 1 to about 5 wt %, with copolymer A having the greater TFE content.

The proportions in which copolymers A and B are blended vary depending on the purpose for which the composition is to be used. Mixtures should be within a range of about 3/97 to about 97/3, and preferably about 10/90 to about 90/10. Compositions obtained by blending about 50 to about 97 parts by weight, preferably about 55 to about 90 parts by weight, of copolymer A with about 50 to about 3 parts by weight, preferably about 45 to about 10 parts by weight, of copolymer B are useful because the flex life and melt strength of the composition are greatly improved without compromising the properties of copolymer A. Blends in which copolymer B predominates have more of the properties of copolymer B with the benefit that gas permeability is reduced in proportion to the content of copolymer A. Reduced gas permeability is desirable in tubing and containers for fluid handling. The proportions of copolymers A and B disclosed herein together total 100 parts by weight.

Various additives may be included in the inventive composition insofar as the objects of the invention are attainable. Examples of suitable additives include ultraviolet absorbers, antistatic agents, pigments, organic and inorganic fillers.

The mixing of copolymer A with copolymer B may be carried out by methods known in the art. Examples of such methods include mixing of aqueous dispersions, mixing of organic solvent-based dispersions, and melt mixing. To achieve uniform mixing at the molecular level, a method involving mixing of among primary particles within an aqueous dispersion (average particle size less than 0.5 mm) is preferred, followed by melt mixing.

EXAMPLES

Examples are given by way of illustration. The starting materials used in the examples and comparative examples, and the methods used for evaluating the physical properties of the resulting compositions are described below.

(1) Polymers

The melt processible fluoropolymers used in the examples and comparative examples are summarized in Table 1 together with their comonomer compositions and melt flow rates. In the table, TFE/HFP-2 is a copolymer of TFE and HFP; TFE/HFP-3 is a terpolymer of TFE, HFP and PEVE. PFA-C2 is a copolymer of TFE and PEVE.

TABLE 1

| Fluoropolymer | Comonomer content (wt %) | | MFR (g/10 min) |
| --- | --- | --- | --- |
| TFE/HFP-2 (A) | HFP 12% | | 24 |
| TFE/HFP-3 (B) | HFP 11.5%; | PEVE 1.2% | 22 |
| TFE/HFP-3 (C) | HFP 6.5%; | PEVE 1.8% | 23 |
| PFA-C2 (D) | | PEVE 13.3% | 10 |
| PFA-C2 (E) | | PEVE 7.1% | 19 |
| PFA-C2 (F) | | PEVE 5.7% | 23 |

MFR: melt flow rate measured at 372° C. and under a load of 5 kg according to the method of ASTM D 1238.

(2) Measurement of Physical Properties (a) Miscibility

A differential scanning calorimeter (DSC) is used to determine whether the melt processible fluoropolymer composition co-crystallizes and constitutes a miscible blend in the crystalline region. Using an internal twin-rotor mixer (R-60, manufactured by Toyo Seiki Seisaku-Sho, Ltd.), a melt blend composed of a molten mixture of TFE/HFP-2 or TFE/HFP-3 with PFA-C2 in a given ratio is prepared. A sample of the blend is heated (360° C. for 5 minutes) at a temperature about 50° C. higher than the melting point of the higher-melting component in the sample, completely melting the crystals. The crystallization temperature is then measured under cooling at the rate of 70° C./min. Following crystallization, the temperature is again raised at the rate of 10° C./min, and the melting point is measured. When a single crystallization peak appears during crystallization and a single melting peak appears between the melting points of the components as the temperature of the crystallized mixture is being raised, the mixture is judged to be a miscible blend in the crystalline region and to have formed co-crystals. Sometimes two melting peaks appear in a sample in which the PFA is recrystallized after having first been melted. However, because the small peak on the high-temperature side above 310° C. is attributable to molecular chains similar to PTFE, the large peak on the low-temperature-side is regarded as the melting point of PFA.

(b) Flex Life

A 0.2 mm thick film is compression molded from the melt processible fluoropolymer composition, and a specimen 110 mm×15 mm is cut from it. The flex life of the specimen is measured by the MIT method under a 1 kg load. The method is described in ASTM D 2156. A Toyoseiki K.K. MIT Folding Endurance Machine is used.

(c) Melt Strength

The melt processible fluoropolymer composition is melt spun at a melt temperature of 370° C. using a Capilograph 1B (die diameter, 1 mm; length to diameter ratio of the die is 20; manufactured by Toyo Seiki Seisaku-Sho, Ltd.) equipped with a high-speed take-off device. The tension of the molten resin when the spun filament breaks is measured with a load cell and this value is reported as the melt strength (in grams). Measurement is made by starting at a take-off speed of 10 m/min, and increasing the take-off over a period of 10 minutes to a maximum of 200 m/min. Increased melt strength indicates that higher extrusion speeds, e.g. wire coating speeds, are possible without tearing or separation of the extrudate.

(d) Nitrogen Gas Permeability

The gas permeability measuring apparatus made by Shibata Chemical Machinery Co. is used to carry out measurements at 230° C. on an approximately 0.3 mm thick films prepared by compression molding at 350° C. Nitrogen permeability is commonly used for evaluating membranes for gas permeability (U.S. Pat. No. 5,688,307), and past experience has shown reasonable correlation between nitrogen, and for example, hydrogen chloride permeability of fluoropolymer membranes. Units of permeability are $cm^3(STP) \cdot cm/cm^2 \cdot sec \cdot cm$ (Hg). "STP" is standard temperature and pressure, i.e. 0° C. and 760 mm of mercury (1.01 kPa).

Examples 1 to 3, and Comparative Examples 1 to 6

Melt blends of TFE/HFP-2 or TFE/HFP-3 with PFA in a 60/40 weight ratio are used to examine differences in miscibility at different comonomer compositions. The results are summarized in Tables 2A and 2B. When the melt blend exhibits a single crystallization peak during crystallization and a single melting peak between the melting points of the individual components during temperature rise in the crystallized mixture, the mixture is judged to be a miscible blend in the crystalline region and the components to have co-crystallized.

TABLE 2A

| | Comparative Examples | | | | | |
|---|---|---|---|---|---|---|
| | 1 | 2 | 3 | 4 | 5 | 6 |
| TFE/HFP-2 (A) | 60 | 60 | 60 | | | |
| TFE/HFP-3 (B) | | | | 60 | 60 | 60 |
| TFE/HFP-3 (C) | | | | | | |
| PFA-C2 (D) | 40 | | | 40 | | |
| PFA-C2 (E) | | 40 | | | 40 | |
| PFA-C2 (F) | | | 40 | | | 40 |
| Crystallization temperature | double | double | double | double | double | double |
| Melting point | double | double | double | double | double | double |
| Miscibility | Immiscible | Immiscible | Immiscible | Immiscible | Immiscible | Immiscible |

Double: Two crystallization temperatures or melting points

TABLE 2B

| | Examples | | |
|---|---|---|---|
| | 1 | 2 | 3 |
| TFE/HFP-2 (A) | | | |
| TFE/HFP-3 (B) | | | |
| TFE/HFP-3 (C) | 60 | 60 | 60 |
| PFA-C2 (D) | 40 | | |
| PFA-C2 (E) | | 40 | |
| PFA-C2 (F) | | | 40 |
| Crystallization temperature | single | single | single |
| Melting point | single | single | single |
| Miscibility | miscible | miscible | miscible |

Single: One crystallization temperature and one melting point

As shown in Table 2, TFE/HFP-3 (C) having a HFP content of 6.5 wt % and a PEVE content of 1.8 wt % co-crystallized with each of the PFA-C2 components. However, TFE/HFP-2 (A) and TFE/HFP-3 (B), which have higher comonomer contents than TFE/HFP-3 (C), do not co-crystallize with PFA-C2. That is, TFE/HFP-2 (A) and TFE/HFP-3 (B), when blended with PFA-C2, form mixtures that exhibit two melting points and two crystallization temperatures.

Examples 4 to 7, Comparative Examples 7 and 8

Melt blends are made. Flex life measurements are obtained using specimens that are compression molded from the resulting compositions. The results are shown in Table 3. The mixture of PFA-C2 (E) with TFE/HFP-3 (C) markedly improves the flex life.

The melt strength of the above sample compositions at 370° C. is measured with a Capilograph. The results are summarized in Table 3. Because the object here is to improve the high-speed spinning properties of TFE/HFP, melt strength measurements are carried out only for mixtures having an TFE/HFP content of at least 60%. Blending PFA-C2 (E) with TFE/HFP-3 (C) results in blends of improved melt strength.

Figure 1B:
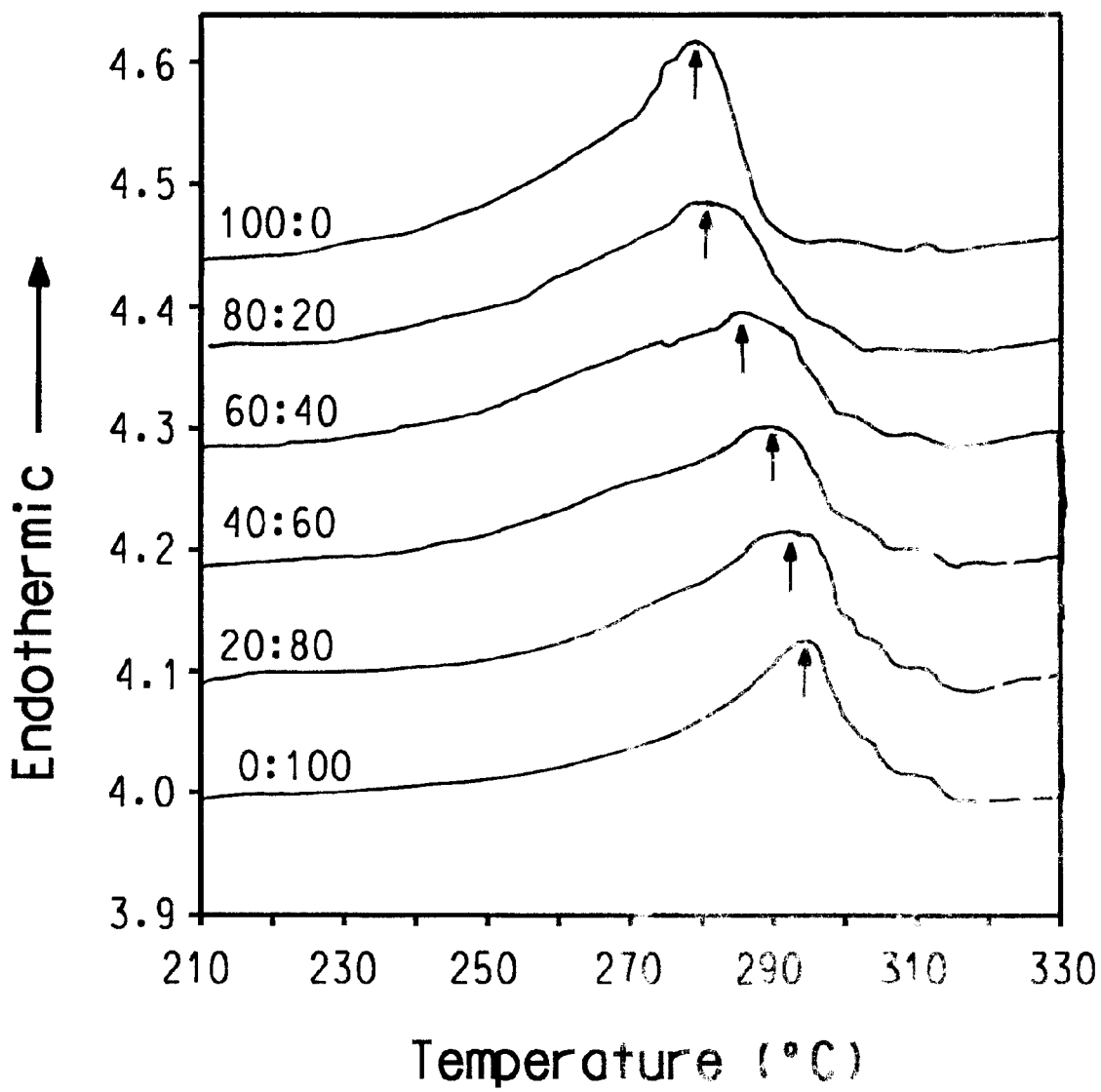
FIG. 1(b) shows the melting peak.

Measured DSC results and DSC charts for the compositions prepared in these examples are summarized in Table 3 and in FIGS. 1(a) and 1(b). As is apparent from FIG. 1, TFE/HFP-3 (C)/PFA-C2 (E) blends at all proportions exhibit single crystallization temperatures and single melting peaks, indicating that the blends co-crystallize in all proportions. In particular, the appearance of a single melting point proportional to the composition indicates that the blend is miscible and co-crystallizes.

TABLE 3

| | Comp. Ex. 7 | Ex. 4 | Ex. 5 | Ex. 6 | Ex. 7 | Comp. Ex. 8 |
|---|---|---|---|---|---|---|
| TFE/HFP-3 (C) | 100 | 80 | 60 | 40 | 20 | 0 |
| PFA-C2 (E) | 0 | 20 | 40 | 60 | 80 | 100 |
| Crystallization temperature (° C.) | 253.5 | 254.7 | 261.6 | 261.6 | 264 | 262.8 |
| Melting point (° C.) | 278.9 | 281.2 | 284.8 | 288.3 | 289.7 | 294.7 |
| Flex life (cycles) | 6,100 | 14,000 | 22,000 | — | — | — |
| Melt strength (g) | 0.56 | 0.59 | 0.61 | — | — | — |

Examples 8 to 11, Comparative Examples 7 and 9

Figure 2A:
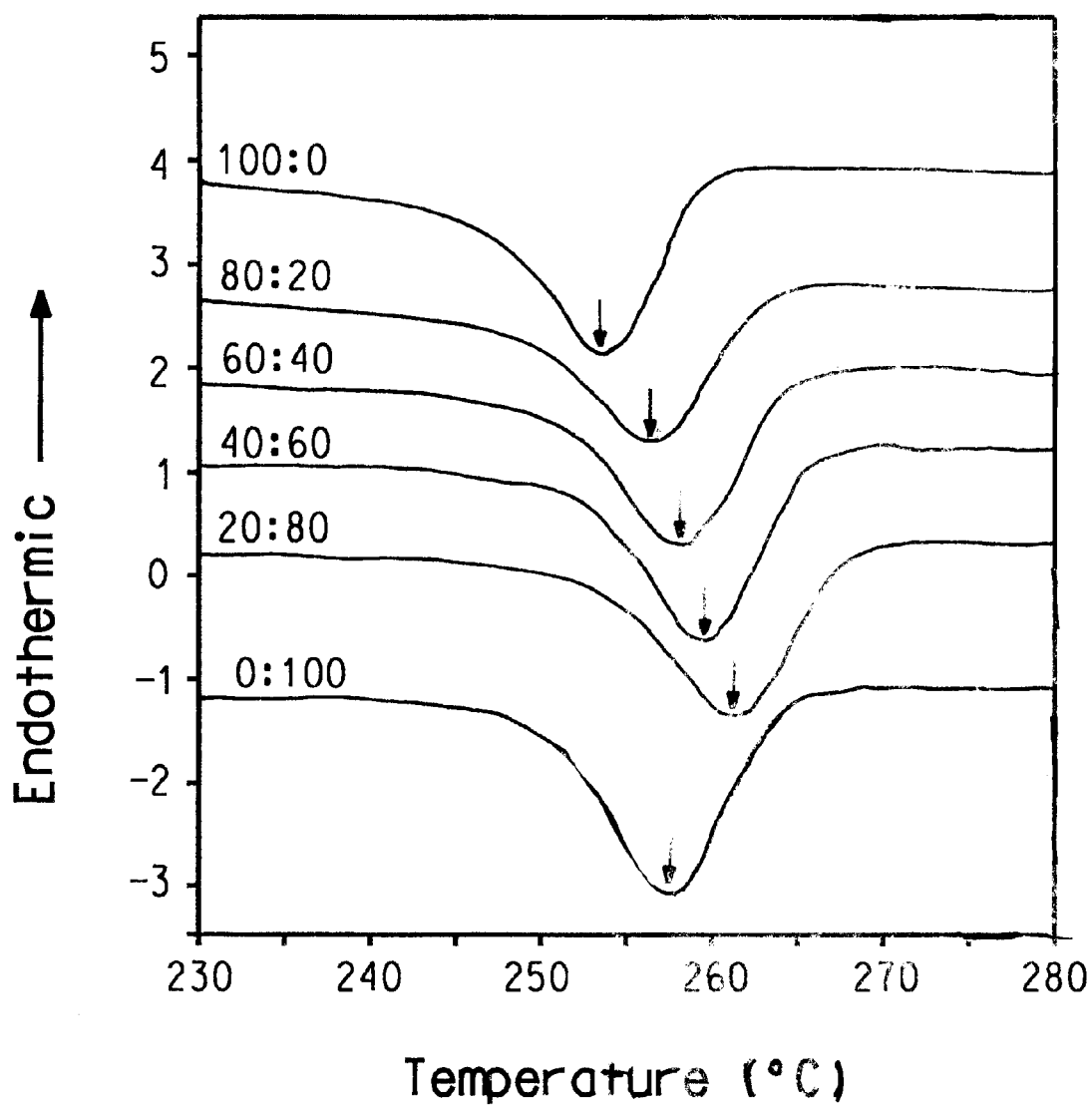
FIG. 2(a) shows the crystallization peak.
Figure 2B:
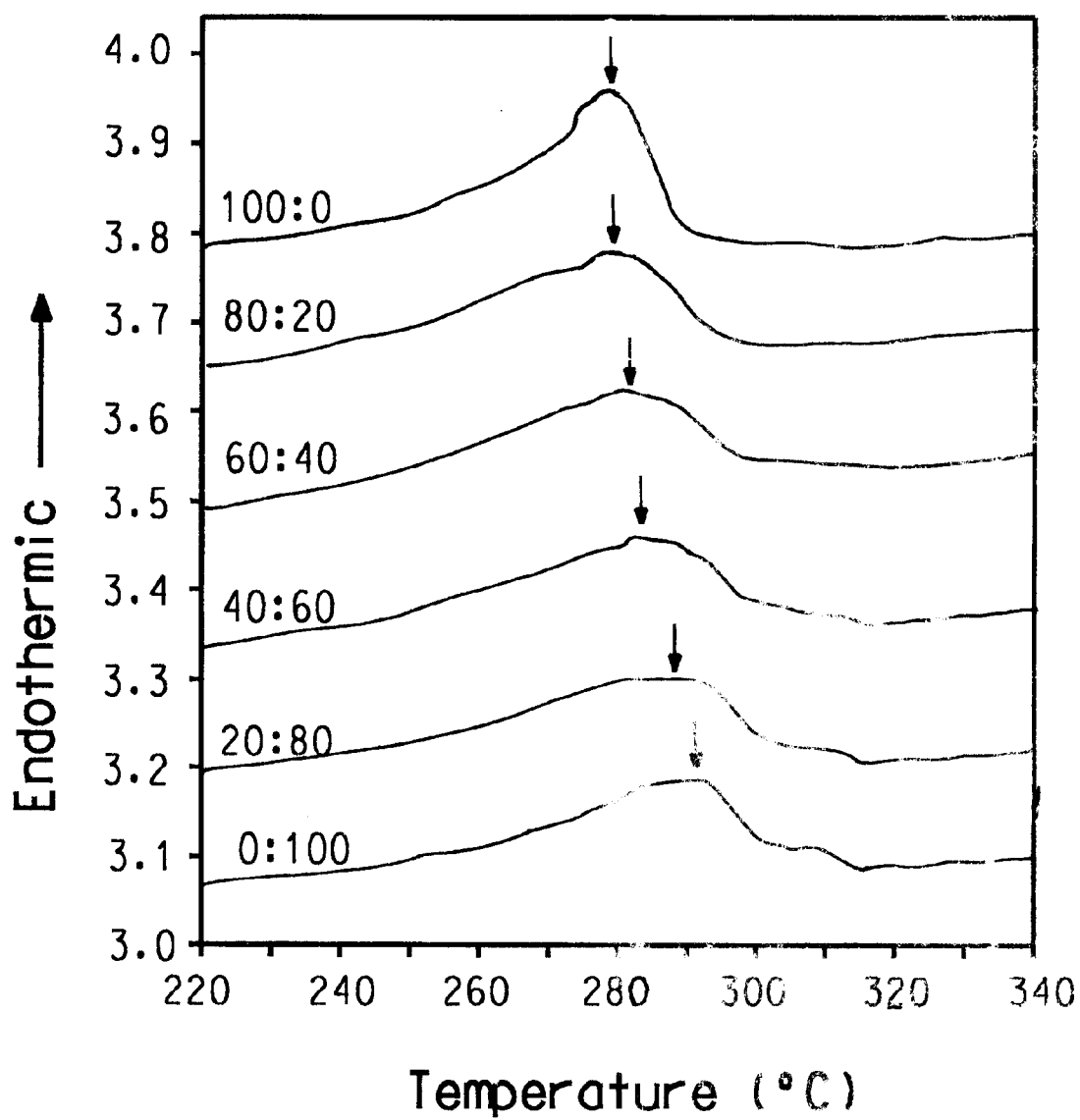
FIG. 2(b) shows the melting peak.

Melt blends are made using TFE/HFP-3 (C)/PFA-C2 (F). The flex life and melt strength for each of the resulting compositions are measured as in Example 3. The results are summarized in Table 4 and FIGS. 2(a) and 2(b).

The blends of PFA-C2 (F) into TFE/HFP-3 (C) have increased flex life and melt strength.

As is apparent from FIG. 2, TFE/HFP-3 (C)/PFA-C2 (F) blends at all proportions exhibit single crystallization temperatures and single melting peaks, indicating that they co-crystallize in all proportions. In particular, the fact that there appears a single melting point at a temperature that is proportional to the composition indicates that the mixture is miscible and co-crystallizes. Although a single crystallization temperature appears, the crystallization temperature for several of the blends is higher than the crystallization temperatures for either component of the blend. The most likely reason is that each blend component acts as nucleating agent at the time of crystallization. This behavior is reported also in mixtures of different polyethylenes that co-crystallize (Journal of Applied Polymer Science 44, p. 719 (1992)).

TABLE 4

|  | Comp. Ex. 7 | Ex. 8 | Ex. 9 | Ex. 10 | Ex. 11 | Comp. Ex. 9 |
|---|---|---|---|---|---|---|
| TFE/HFP-3 (C) | 100 | 80 | 60 | 40 | 20 | 0 |
| PFA-C2 (F) | 0 | 20 | 40 | 60 | 80 | 100 |
| Crystallization temperature (° C.) | 253.5 | 257 | 259.3 | 259.3 | 261.6 | 258.1 |
| Melting point (° C.) | 278.5 | 278.9 | 279.5 | 282.1 | 287.2 | 288.9 |
| Flex life (cycles) | 6,100 | 35,000 | 45,000 | — | — | — |
| Melt strength (g) | 0.56 | 0.66 | 0.71 | — | — | — |

Example 12

PFA-C2 (E) has a nitrogen permeability of 0.96 cm$^3$(STP)·cm/cm$^2$sec·cm (Hg). A melt blend of 60 wt % PFA-C2 (E) with 40 wt % TFE/HFP-3 (C) is made and the nitrogen permeability is measured. Nitrogen permeability is found to be reduced below that of unblended PFA-C2 (E).

What is claimed is:

1. A melt processable fluoropolymer composition having a single crystallization temperature and a single melting point, as measured with a differential scanning calorimeter, said composition comprising:

(A) about 3 to about 97 parts by weight of a tetrafluoroethylene-hexafluoropropylene copolymer comprising about 3 to about 9 wt % hexafluoropropylene, and 0 to about 4 wt % of a third monomer that is at least one additional monomer selected from the group consisting of perfluoro(propyl vinyl ether), perfluoro(ethyl vinyl ether), and perfluoro (methyl vinyl ether), and about 89 to about 97 wt % tetrafluoroethylene; and (B) about 97 to about 3 parts by weight of a copolymer comprised of about 80 to about 99 wt % tetrafluoroethylene with about 1 to about 20 wt % of one or more comonomers selected from the group consisting of perfluoro(ethyl vinyl ether) and perfluoro(methyl vinyl ether).

2. The melt processable fluoropolymer composition of claim 1, wherein the third monomer of copolymer A and the comonomer of copolymer B are perfluoro(methyl vinyl ether) or perfluoro(ethyl vinyl ether) or both.

3. The melt processable fluoropolymer composition of claim 1 wherein the tetrafluoroethylene content of copolymer A is equal to or greater than the tetrafluoroethylene content of copolymer B, and the difference between the tetrafluoroethylene content of copolymer A and the tetrafluoroethylene content of copolymer B is in a range of 0 to about 6 wt %.

4. The melt processable fluoropolymer composition of claim 1 wherein the tetrafluoroethylene-hexafluoropropylene copolymer comprises at least about 50 parts by weight or more of said composition.

* * * * *